July 21, 1959     A. U. BRYANT     2,895,495
VALVE CONSTRUCTION
Filed Dec. 20, 1954
FIG_1_
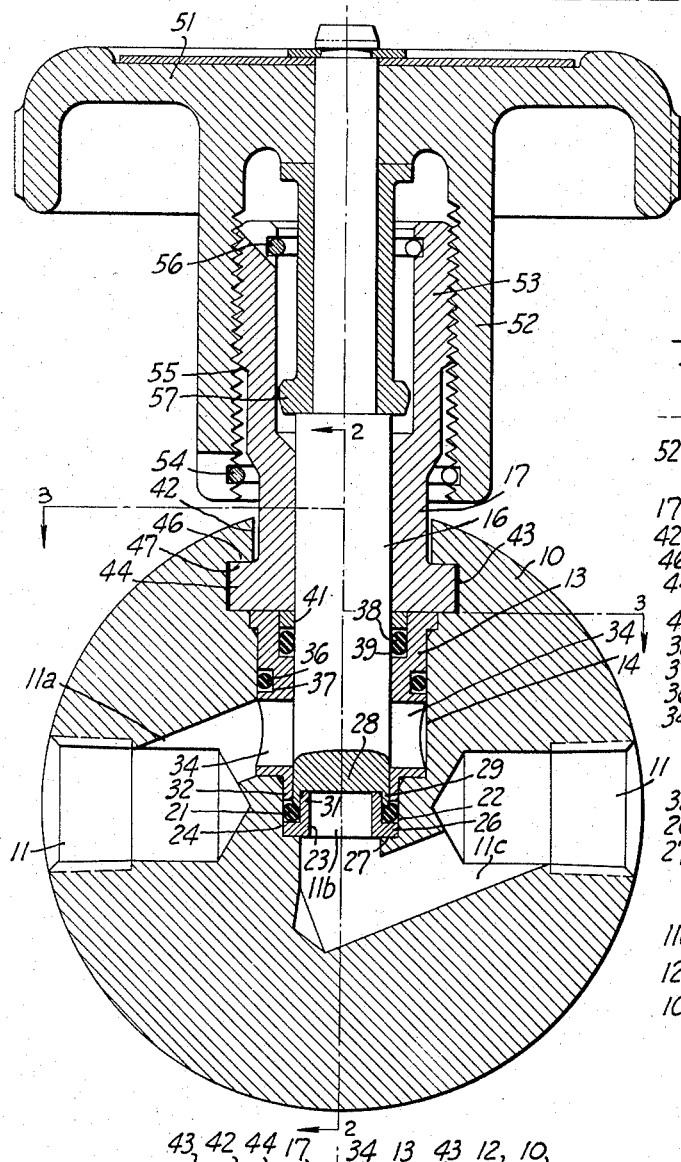
FIG_2_
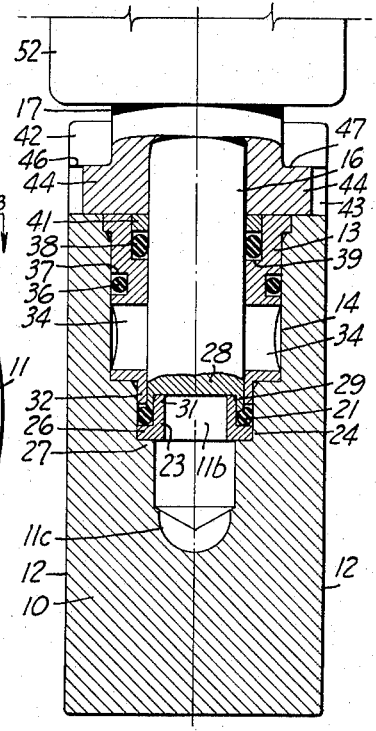
FIG_3_
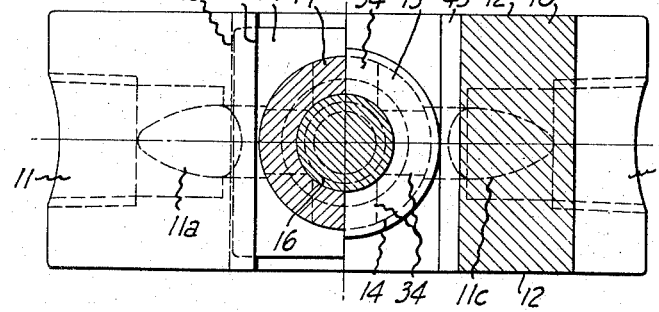
INVENTOR.
Austin U. Bryant
BY
ATTORNEYS

United States Patent Office 2,895,495
Patented July 21, 1959

2,895,495

VALVE CONSTRUCTION

Austin U. Bryant, Walnut Creek, Calif., assignor, by mesne assignments, to Walworth Company, New York, N.Y., a corporation of Massachusetts Application December 20, 1954, Serial No. 476,101

4 Claims. (Cl. 137—315)

This invention relates generally to the construction of valves, and particularly valves such as made in the smaller sizes.

In general it is an object of the present invention to provide a valve construction incorporating a novel and simple assembly, which can be economically manufactured, and which is simple to assemble and service.

Another object of the invention is to provide a valve of the above character having novel means for attaching and retaining its bonnet, and which does not require a seal between the bonnet and the valve body.

Another object of the invention is to provide a novel valve construction of the type making use of O-ring sealing means, and which facilitates the manufacture, assembly and servicing of such valves.

Additional objects and features of the invention will appear from the following description in which the preferred embodiment has been set forth in detail in the accompanying drawing.

Referring to the drawing:

Figure 1 is a side elevational view in section illustrating a valve incorporating the present invention.

Figure 2 is a cross-sectional view taken along the line 2—2 of Figure 1.

Figure 3 is a cross-sectional view taken along the line 3—3 of Figure 1.

The valve illustrated in the drawing consists of a body 10 provided with the flow passages 11. These passages are threaded or otherwise formed to facilitate making connections with associated fluid piping. The body, in this instance, is circularly contoured as viewed in Figure 1, and has flat parallel end faces 12. It should be understood however, that other shaping or contouring of the body can be used. For example, the shape as viewed in Figure 1 can be square, rectangular or octagonal, and the end faces 12 need not be parallel or flat. It is assumed however, that the body will be constructed by cutting off short lengths of a metal bar of a suitable diameter, thus providing the flat parallel end faces 12 and the circular contouring.

An annular sleeve 13 is fitted within the body bore 14, and surrounds the operating stem 16. A bonnet member 17 also surrounds the stem 16, and as will be presently explained, is attached to the body in a novel manner.

The flow control means associated with the inner end of the stem 16 may be a simple valve member and stationary annular seat having metal to metal or resilient seating surfaces. The particular type of flow control means illustrated is disclosed and claimed in copending application Serial No. 338,287 filed February 24, 1953. Briefly, it consists of a resilient seal ring 21 of the O-ring type, which is accommodated within an annular recess 22. The annular recess is formed in part by the metal seat ring 23, which is fitted within the body bore 24, and which has a flange 26 that seats upon the body shoulder 27. The inner end portion 28 of the stem 16 forms a movable valve member for cooperating with the seal ring 21. Thus portion 28 is provided with an annular depending lip 29, which when in closed valve position embraces the annular portion 31 of the seat ring 23. The annular portion 31 of the sleeve 13 terminates in an annular end face, which serves to define one surface of the O-ring retaining recess. Portion 32 also embraces a portion of the lip 29 for closed position of the valve. It will be noted that one corner edge of the lip 29 contacts and presses against the resilient O-ring for closed valve position, and as disclosed in said copending application, such engagement provides an effective seal against pressure differential applied in either direction.

The sleeve 13 is provided with fluid ports 34, one of which is alined with the body passage extension 11a. For full open position of the valve, the stem is raised sufficiently far whereby the lip 29 uncovers all or a substantial part of the ports 34. For open valve position fluid flow occurs through the throat passage 11b of the seat ring 23, and the passage extension 11c.

The sleeve 13 is sealed both with respect to the body and the stem. Preferably, both such sealing means are of the O-ring type. Thus, an O-ring 36 is accommodated in the annular recess 37 formed in the sleeve, and establishes a seal between the sleeve and the body. Another O-ring 38 is accommodated in the sleeve recess 39, and forms a seal between the sleeve and the valve stem 16. Recess 39 is closed by the collar or washer 41, which has its exposed end face contiguous with the adjacent end face of the sleeve 13.

The bonnet member 17 has an interlock connection with the body whereby for application or removal of the bonnet, it is only necessary to move the bonnet laterally of its axis, and the stem 16 removed. Thus in the particular construction illustrated the body has an open slot 42 which extends across the body between the end faces 12. The sides of this slot are interrupted by the oppositely faced parallel grooves or recesses 43. One end of the bonnet 17 is formed to provide the lugs 44, which are dimensioned to interfit the slots 43. A relatively loose fit is provided between the bonnet and the body, whereby it is a simple matter to apply or remove the bonnet by movement of the same laterally of its axis.

When assembled with the body, flat abutment shoulders 46 and 47 are formed respectively on the body and the bonnet, and these abutment shoulders carry any outward thrust applied to the bonnet. It will be noted that the inner face of the bonnet directly engages the adjacent end faces of the sleeve 13 and the washer 41, whereby when assembled the bonnet holds the sleeve 13 in operating position within the body, and likewise retains the washer 41 in operating position relative to the O-ring 38.

Suitable means is associated with the bonnet and the stem for moving the latter between open and closed valve positions. In the hand operated embodiment illustrated, a knob or hand wheel 51 is journaled to the outer end of the stem, and is provided with an internally threaded sleeve extension 52 that engages the externally threaded portion 53 of the bonnet. Thus upon turning the handwheel in opposite directions, the valve stem is moved outwardly or inwardly between open and closed positions. To provide a stop for full open position a snap-in ring 54 is provided on extension 52 and is adjusted to engage the shoulder 55. A further safety stop means is formed by snap-in ring 56 together with collar 57.

The assembly and operation of the valve described above is as follows: The seat ring 23 is placed within the body upon the shoulder 27, followed by the O-ring 21 and the sleeve 13. The O-ring 36 establishes a seal between the sleeve and the body. The O-ring 38 together with the washer 41, are assembled upon the sleeve 13, prior to the latter's insertion. The bonnet is now applied to the body by alining the lugs 44 within the recesses 43, followed by lateral movement of the bonnet until it is alined with the axis of the sleeve. Thereafter the stem 16 is inserted through the bonnet and the sleeve 13, and by engaging the threaded portions 52 and 53 with the turning of the handwheel 51, the stem is advanced to normal operating position. The bonnet is now effectively locked to the body because it is retained against lateral removal by the stem.

When it is desired to service the valve it is a simple matter to remove the stem 16 by first removing ring 54, with the valve closed, followed by turning the handwheel to disengage the threaded engagement with the bonnet, and then removing ring 56 to permit the stem to be retracted. Thereafter the bonnet is removed from the body by moving it laterally, thereby permitting removal of the sleeve 13. With the removal of this sleeve any one or all of the O-rings can be replaced.

It will be apparent from the above that my invention provides a valve of novel construction which lends itself to economical manufacture. The slots 42 together with the recesses 43 can be formed by various simple machining operations such as milling or the like. The interlock provided between the bonnet and the body facilities the assembly and servicing, and in addition, has many advantages over conventional bonnet connections. The O-rings associated with the sleeve 13 effectively establish a seal between the stem and the body, without the necessity of establishing a seal with respect to the bonnet.

I claim:

1. In a valve construction, a body having flow passages adapted to be connected to associated piping, a flow control means within the body, a sleeve fitted within the body and ported for flow of fluid through the same, an operating stem fitted within the sleeve and operatively connected with said flow control means, means forming a seal between the sleeve and the body, means carried by the sleeve forming a seal between the same and the operating stem, a bonnet member surrounding the stem, the body having a slot open at the end faces of the body, said slot being adjacent the exterior end of the sleeve and serving to accommodate the adjacent end portion of the bonnet, and means forming an interlock between the bonnet and the body, said means including abutment surfaces engaged by insertion of the bonnet into the slot from one end face of the body.

2. A valve as in claim 1 in which the bonnet is retained in such interlocking engagement by said operating stem.

3. In a valve construction, a body having a flow passage adapted to be connected to associated piping, a movable sleeve fitted within the body, said sleeve being ported for flow of fluid between the passages, an operating stem fitted within the sleeve and extending to the exterior of the body, a valve member formed on the inner end of the stem, resilient sealing means of the O-ring type carried by the body and adapted to be engaged by said valve member, said sealing means being retained in operating position within the body by said sleeve, sealing means of the O-ring type forming a seal between the sleeve and the body, a resilient O-ring forming a seal between the sleeve and the stem, said sleeve being provided with an annular recess to accommodate said O-ring, a thrust washer fitted within said recess and forming an abutment surface for one side of the O-ring, said washer having an exterior surface contiguous with the adjacent end surface of the sleeve, a bonnet member surrounding the stem, the body having a slot open at the end faces of the body and serving to accommodate the bonnet, one end face of the bonnet being adjacent to said end face of the sleeve, and means forming an interlock between the bonnet and the body, said last means including abutment surfaces engaged by insertion of the bonnet into the slot from one end face of the body.

4. In a valve construction, a body having a flow passage adapted to be connected to associated piping, flow control means within the body, a movable sleeve fitted within said body, said sleeve being ported for flow of fluid between the passages, an operating stem fitted within said sleeve and operatively connected with said flow control means, the body being provided with a bore adapted to accommodate the stem, said stem being movable lengthwise of the bore, a resilient O-ring forming a seal between the sleeve and the body, an additional resilient O-ring forming a seal between the sleeve and the operating stem, said sleeve being provided with annular recesses to accommodate said O-rings, the body having a slot open at both end faces of the body and in alignment with the bore and communicating with the outer end of the bore, the body also being provided with oppositely faced parallel recesses adjacent the outer face of the bore and on opposite sides of said slot, said recesses extending between end faces of the body, a bonnet surrounding the stem, and locking lugs formed on one end portion of the bonnet and engaged within said recesses to prevent movement of the bonnet lengthwise of the bore, said stem serving to prevent movement of said bonnet in said slot sidewise of the bore.

References Cited in the file of this patent

UNITED STATES PATENTS

| 807,309 | Ott | Dec. 12, 1905 |
| 1,481,663 | Davis | Jan. 22, 1924 |
| 1,484,727 | Love | Feb. 26, 1924 |
| 2,508,843 | Semak | May 23, 1950 |
| 2,574,851 | Wagner | Nov. 13, 1951 |

FOREIGN PATENTS

| 154,926 | Austria | of 1904 |